United States Patent [19]

Miyadera et al.

[11] Patent Number: 5,316,899
[45] Date of Patent: May 31, 1994

[54] OPTICAL RECORDING MEDIUM

[75] Inventors: Toshiyuki Miyadera; Makoto Okano; Fumio Matsui, all of Saitama, Japan

[73] Assignee: Pioneer Electronic Corporation, Tokyo, Japan

[21] Appl. No.: 807

[22] Filed: Jan. 5, 1993

Related U.S. Application Data

[63] Continuation of Ser. No. 679,489, Apr. 2, 1991, abandoned.

[30] Foreign Application Priority Data

Oct. 15, 1990 [JP] Japan .................................. 2-277194

[51] Int. Cl.$^5$ ........................... G03C 1/00; G11B 7/24
[52] U.S. Cl. ..................................... 430/495; 430/270; 430/945; 369/284; 369/288; 346/135.1
[58] Field of Search ................... 430/495, 945, 270; 346/135.1; 369/284, 288

[56] References Cited

U.S. PATENT DOCUMENTS

| 3,250,780 | 5/1966 | Rai et al. | 548/220 |
|---|---|---|---|
| 4,173,483 | 11/1979 | Habu et al. | 430/945 |
| 4,460,665 | 7/1984 | Kunikane et al. | 430/945 |
| 4,735,889 | 4/1988 | Namba et al. | 430/495 |
| 4,737,427 | 4/1988 | Miyazaki et al. | 346/135.1 |
| 4,767,693 | 8/1988 | Oba et al. | 430/945 |
| 4,767,696 | 8/1988 | Ishimoto et al. | 346/135.1 |
| 4,794,068 | 12/1988 | Miyazaki et al. | 430/495 |
| 4,830,874 | 5/1989 | Kawabata et al. | 427/402 |
| 4,845,021 | 7/1989 | Miyazaki et al. | 430/945 |
| 4,943,515 | 7/1990 | Okazaki et al. | 430/495 |
| 4,944,980 | 7/1990 | Akutsu et al. | 346/135.1 |
| 4,960,679 | 10/1990 | Nakagiri et al. | 430/945 |
| 5,079,061 | 1/1992 | Hashida et al. | 430/495 |

FOREIGN PATENT DOCUMENTS 62-167088  7/1987  Japan .

Primary Examiner—Charles L. Bowers, Jr.
Assistant Examiner—Martin Angebranndt
Attorney, Agent, or Firm—Sughrue, Mion, Zinn, Macpeak & Seas

[57] ABSTRACT

An optical recording medium having at least a pair of recording films which have a predetermined light absorption distribution and have steep absorption end slopes which are closer to each other. The difference between the wavelengths of recording or reproduction lights for these two recording films may be close to about 50 nm. A common optical system may be used for recording or reproduction operation for the two recording films, whereby the optical system may be simplified.

4 Claims, 4 Drawing Sheets

OPTICAL RECORDING MEDIUM

This is a continuation of U.S. patent application Ser. No. 07/679,489 filed Apr. 2, 1991, now abandoned.

FIELD OF THE INVENTION AND RELATED ART

The present invention relates to an optical recording medium comprising a substrate and a recording film disposed thereon wherein the recording film has a multi-layer structure and comprises a laminate comprising coloring matter LB film of different species.

Recently, various recording films such as coloring matter film have been developed as recording films for optical recording media. Such a coloring matter layer is formed on a substrate, e.g., by spin coating. For example, in the case of such a coloring matter film, a semiconductor laser beam is concentrated on the coloring matter film and the laser beam is converted into a heat energy to change the property on state of the coloring matter film, whereby recording is effected. Further, reproduction is effected by utilizing the difference in reflection light quantity or transmission light quantity between the resultant recorded portion and the non-recorded portion.

However, in the conventional optical recording medium, the recording density (or packing density) is limited to $10^8$ bit/cm$^2$ on the basis of the diffraction to the light to be used for access. Accordingly, there has been desired an optical recording medium which is adaptable to high-density recording to be used in a highly developed information oriented society.

As one of the means for enhancing the recording density of an optical recording medium, there is a method wherein an optical recording medium capable of vertical (or perpendicular) recording is used and the recording density per unit volume is improved. In this method, a multi-layer recording film is formed by laminating plural coloring matter (or dye) films of different species, and the resultant multi-layer recording film is irradiated with a semiconductor laser beam having different wavelength to effect recording and reproduction (multiple wavelength optical recording), whereby vertical recording in an optical recording medium is enabled.

However, in a case where a coloring matter film is formed on a substrate by spin coating, the resultant coloring matter film has a thickness of several hundreds of angstroms to several thousands of angstroms. Accordingly, when a semiconductor laser beam is supplied to such a multi-layer coloring matter film, it is necessary to concentrate the laser beam on each of the coloring matter films constituting the above-mentioned multi-layer coloring matter film. As a result, there occurs a problem such that complicated control is required.

Recently, there has been made an attempt to apply a Langmuir-Blodgett film (LB film) formed by causing a monomolecular film disposed on a water surface to be adsorbed on a substrate to the field of electronics, etc. The LB film may have a thickness of the order (or level) of molecule and is a uniform thin film wherein molecular orientation is controlled. Therefore, when a coloring matter LB film is formed on a substrate by using a coloring matter, the resultant LB film has a thickness which is about 1/10 times that of the conventional coloring matter film formed by spin coating, etc.

As a result, even in a state where plural coloring matter LB films of different species are laminated on a substrate the entirety of the laminated coloring matter dye LB film are within the focal depth of a semiconductor laser beam to be used, whereby the concentration of the laser beam may easily be controlled.

Further, the coloring matter film formed on a substrate by spin coating, etc., shows an absorption spectrum comprising a broad absorption. In a certain coloring matter film formed as an LB film, however, a so-called "J-aggregate" is formed, and the absorption peak is shifted to the longer wavelength side and becomes sharper. Further, such a coloring matter is useful in a case where vertical recording is effected on an optical recording medium without requiring the complicated concentration control of a semiconductor laser beam.

In the prior art, however, a medium is constituted by laminating plural materials having similar absorption spectrum patterns as recording films. More specifically each of such materials has an absorption spectrum such that the absorption on the longer wavelength side has a steep slope and the absorption on the shorter wavelength side has gentle slope, with respect to the absorption wavelength peak. Accordingly, the absorption wavelength peaks of respective layers become closer to each other as shown in FIG. 4, a portion of the absorption of one material having a gentle slope overlaps with a portion of the absorption wavelength peak of another material. As a result, there occurs a problem such that recording or reproduction is simultaneously effected on two recording films.

In order to solve such a problem, it is possible that one of these material per se is changed so as to respectively set the absorption wavelength peaks of the two recording film materials in wavelength regions providing a wavelength difference of 200 nm or larger, as shown in FIG. 5. In such a case, however, it is necessary to set an optical system so that it corresponds to each of the plural recording films. As a result, there occurs a new problem such that the optical system becomes complicated.

SUMMARY OF THE INVENTION

A principal object of the present invention is, in view of the above-mentioned problems encountered in the prior art, to provide an optical recording medium wherein the wavelengths of recording or reproduction lights corresponding to at least a pair of recording films are brought closer to each other so as to provide a wavelength difference therebetween of about 50 nm, whereby an optical system to be used in combination therewith is capable of being simplified.

According to the present invention, there is provided an optical recording medium comprising at least a pair of laminated recording films having a light absorption band in a predetermined wavelength region;

wherein one of the laminated recording film has a first absorption peak at a first specific wavelength and a steeper on slope between the first absorption peak and a point of inflection on the longer wavelength side with respect to the first absorption peak; the other of the laminated recording film has a second absorption peak at a second specific wavelength which is in the neighborhood of the first specific wavelength and is longer than the first specific wavelength, and a steeper absorption slope between the second absorption peak and a point of inflection on the shorter wavelength side with respect to the second absorption peak; and the steep absorption slopes are near to each other.

In general, when the optical recording medium according to the present invention is used, recording light in the form of a pulse is supplied thereto while the medium is rotated. At this time, the J-aggregate disposed in the irradiated portion of the recording film is dissociated or decomposed to cause a decrease in absorbance.

The reproduction of such recording based on the above-mentioned decrease in absorbance may also be effected by detecting a difference in absorbance in transmission light or reflection light based on reading light under the rotation of the medium.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
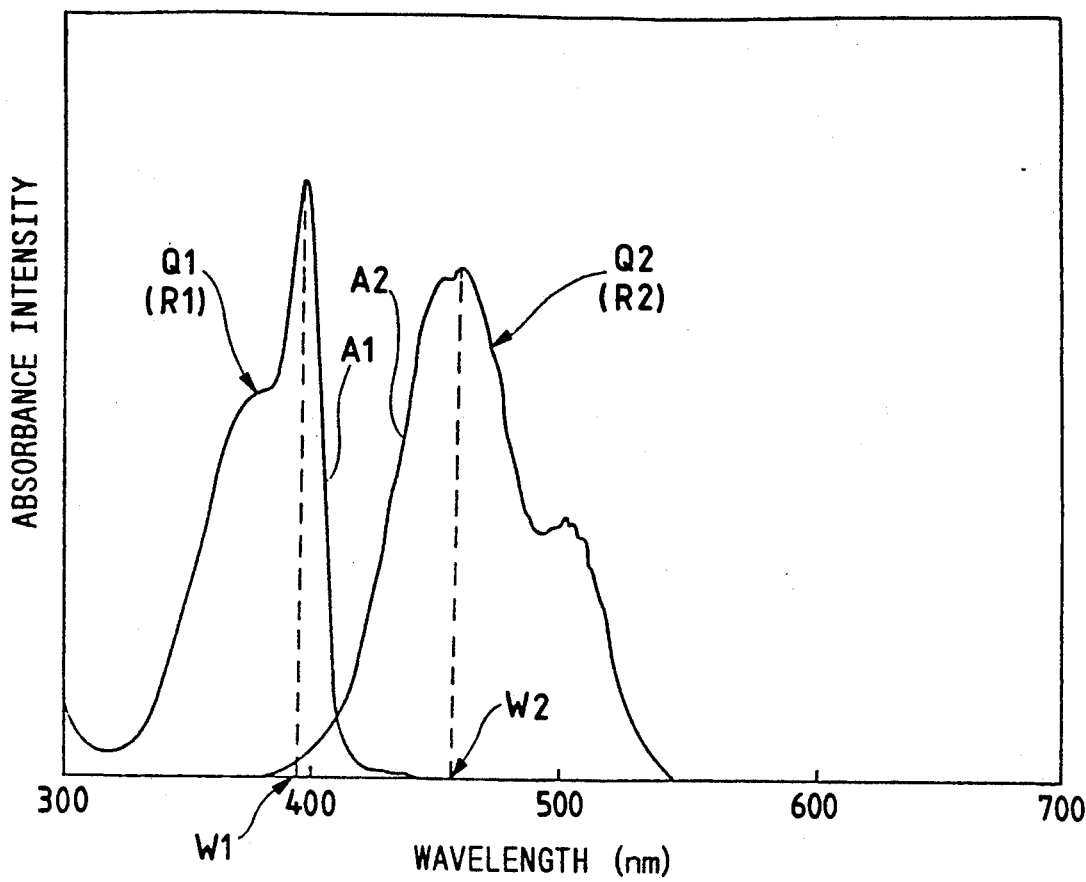
FIG. 1 is a graph showing a relationship between an absorbance and the wavelengths for recording films $R_1$ and $R_2$. respectively, to be used in the optical recording medium according to the present invention.

Hereinbelow, there is specifically described an embodiment of the optical recording medium according to the present invention.

In the recording medium according to the present invention, a substrate in the form of a plate comprising a material such as glass and organic polymer may generally be used.

On such a substrate, there is disposed a recording film which may be laminated by an LB film formation method. In the present invention, at least a pair of recording films constituting the multi-layer recording film are formed so as to provide a predetermined pattern under the following specification.

More specifically, FIG. shows an absorbance distribution (on the left side of the drawing) of one recording film $R_1$ and an absorbance distribution Q2 (on the right side of the drawing of another recording film $R_2$. Between such a pair of recording films, the recording film $R_1$ has an absorption peak at a first specific wavelength (W1), and has a steep absorption slope (A1) on the longer wavelength side and a gentle absorption region on the shorter wavelength side with respect to the above absorption peak. On the other hand, another recording film $R_2$ has an absorption peak at a second specific wavelength (W2) in the neighborhood of the above first specific wavelength (W1) on the longer wavelength side as compared with the wavelength W1, and has a steep absorption slope (A2) on the shorter wavelength side and a gentle absorption region on the longer wavelength side with respect to the above absorption peak. It is preferred that the wavelength difference between the above-mentioned pair of the absorption peaks W1 and W2 is as small as possible. More specifically such a wavelength difference may preferably be 10–100 nm.

Specific examples of the material constituting the recording film of $R_1$ type having a steep absorption slope on the longer wavelength side may include the following cyanine type coloring matter (i.e., dye or pigment) represented by formulas (D-1) to (D-3) as described below;

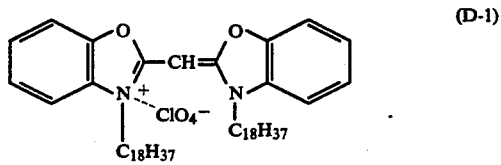
(D-1)

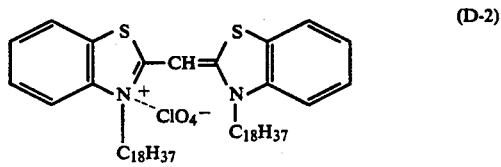
(D-2)

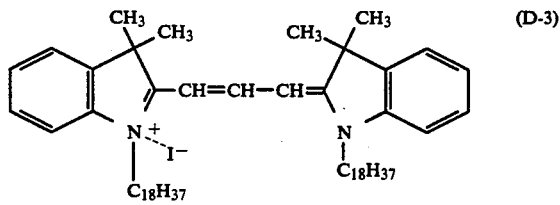
(D-3)

The coloring matter (D-1) has an absorption peak wavelength of 400 nm, the coloring matter (D-2) has an absorption peak wavelength of 450 nm, and the coloring matter (D-3) has an absorption peak wavelength of 600 nm.

On the other hand, specific examples of the material constituting the recording film of $R_2$ type having a steep absorption slope on the shorter wavelength side may include the following cyanine type coloring matter (i.e., dye or pigment) represented by formulas (D-4) to (D-6) as described below;

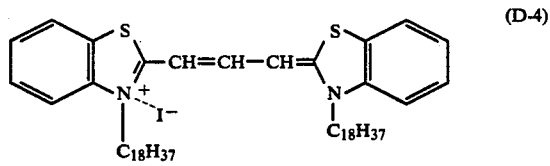
(D-4)

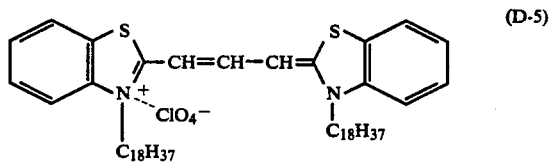
(D-5)

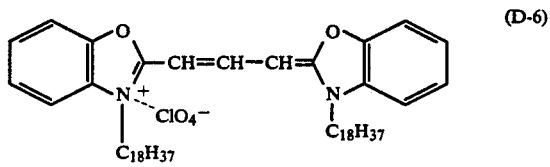
(D-6)

The coloring matter (D-4) has an absorption peak wavelength of 520 nm, the coloring matter (D-5) has an absorption peak wavelength of 530 nm, and the coloring matter (D-6) has an absorption peak wavelength of 460 nm.

In the $R_1$ recording film shown in FIG. 1, the above coloring matter (D-1) and in the $R_2$ recording film shown in FIG. 1 the above coloring matter (D-6) is used.

It is preferred to incorporate a film formation aid in the recording film according to the present invention. As the film formation aid, it is preferred to use long-chain fatty acids and derivatives thereof, singly or a mixture of two or more species thereof. Among these, &he long-chain fatty acid may particularly preferably be used.

It is preferred to incorporate the above aid in an amount of 0.5-2.5 mols, more preferably 1-2 mols with respect to 1 mol of the above coloring matter.

The above-mentioned recording film may preferably be formed by using a so-called LB film formation process, the outline of which is described below.

Figure 2:
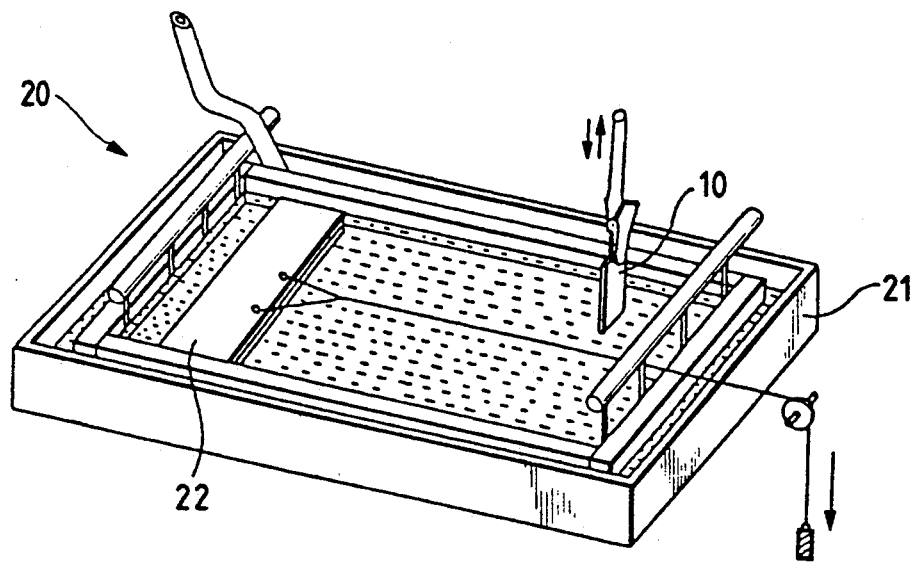
FIG. 2 is a schematic perspective view showing an embodiment of the LB film preparation device.

FIG. 2 is a schematic perspective view showing an embodiment of the device for producing an LB film.

Referring to FIG. 2, the device 20 for producing an LB film is equipped with a water tank 21 for containing therein a subphase liquid. In preparation, a sample comprising a solvent and a coloring matter (i.e., dye or pigment) and a film formation aid dissolved therein is dripped (or dropped) onto the subphase liquid. In such a case, it is preferred to use the coloring matter and the film formation aid so as to provide a mixing ratio therebetween in the range as described above. In the thus dripped sample, the solvent spreads over the subphase liquid and is evaporated, and the coloring matter molecules rapidly spread over a vapor-liquid interface and are oriented so that hydrophilic groups protrude to the subphase liquid and hydrophobic groups protrude to the atmosphere, thereby to form a monomolecular film (or monolayer).

Then, a barrier 22 is moved right in the drawing to apply a film pressure (or, membrane pressure) to the monomolecular film so as to arrange and pack the monomolecular film.

Figure 3:
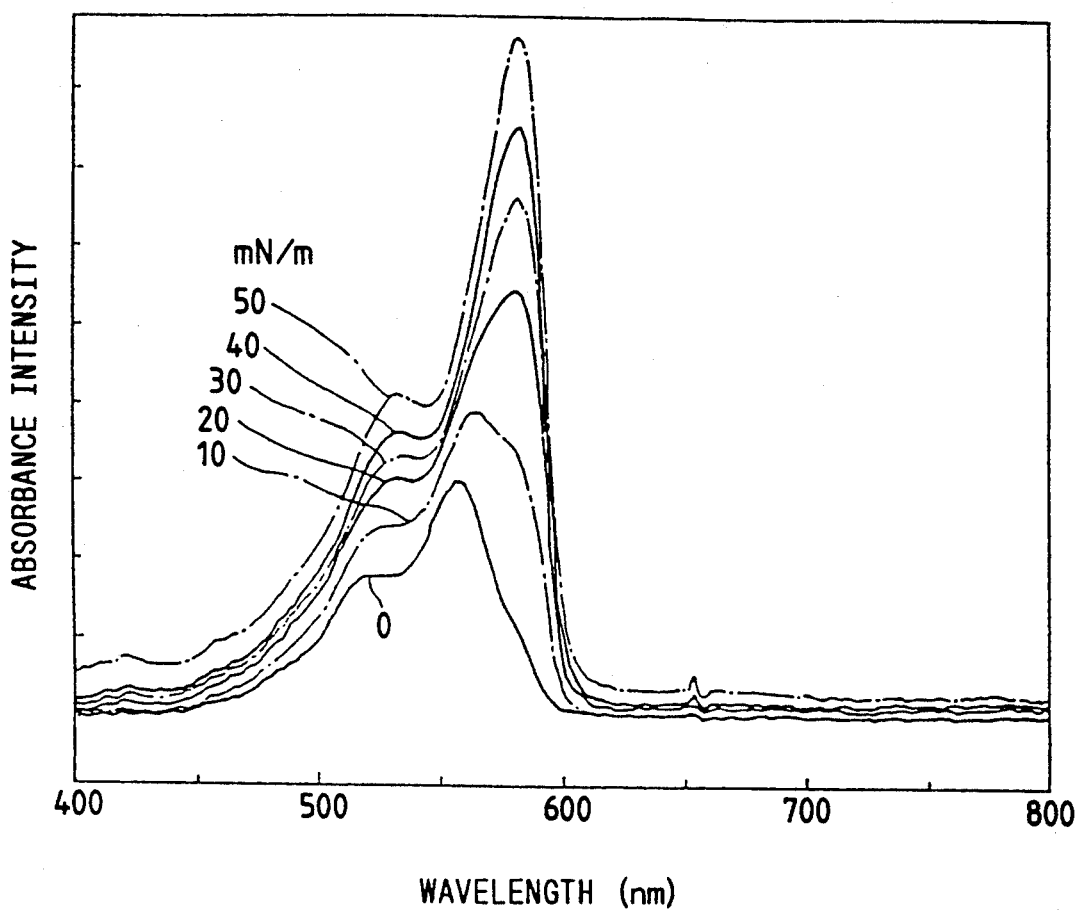
FIG. 3 is a graph showing a wavelength-absorbance curve based on a change in surface pressure (film pressure)
Figure 4:
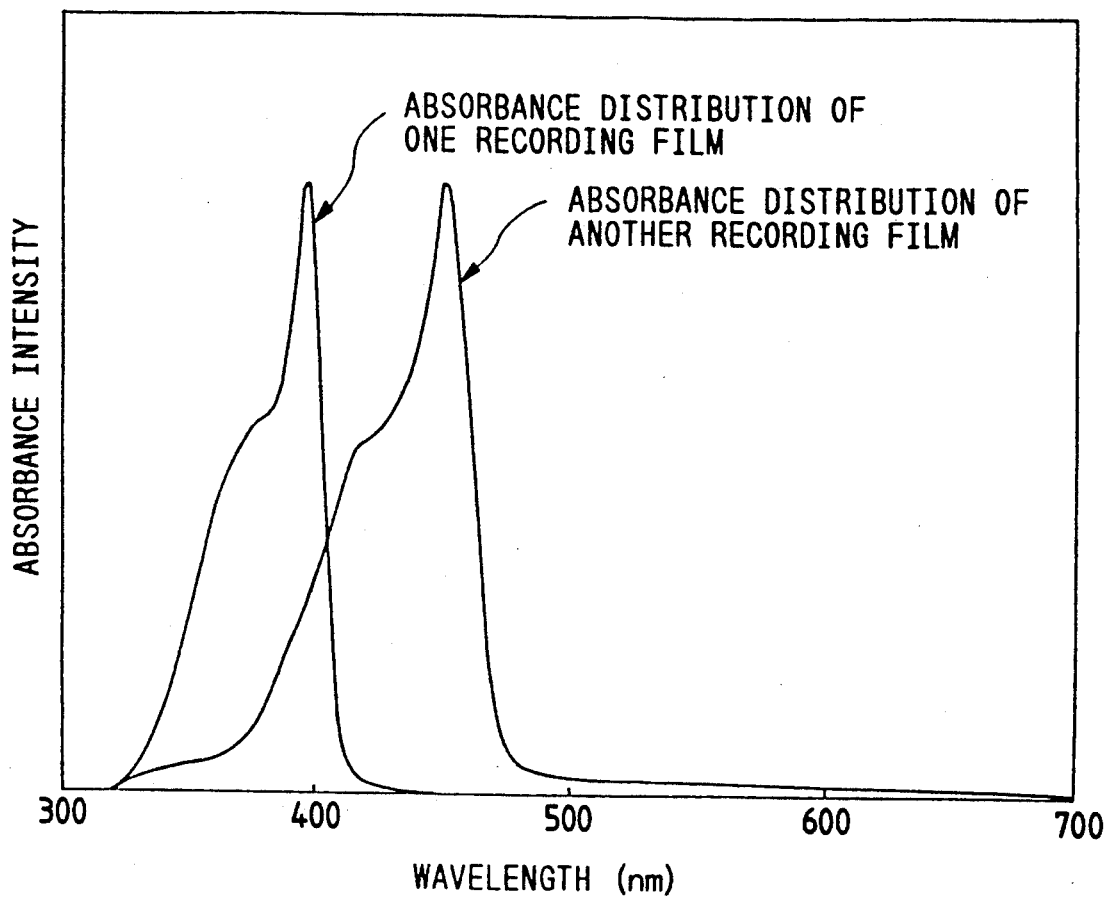
FIGS. 4 and 5 are graphs each showing a relationship between wavelength and absorbance in the conventional recording film structure.
Figure 5:
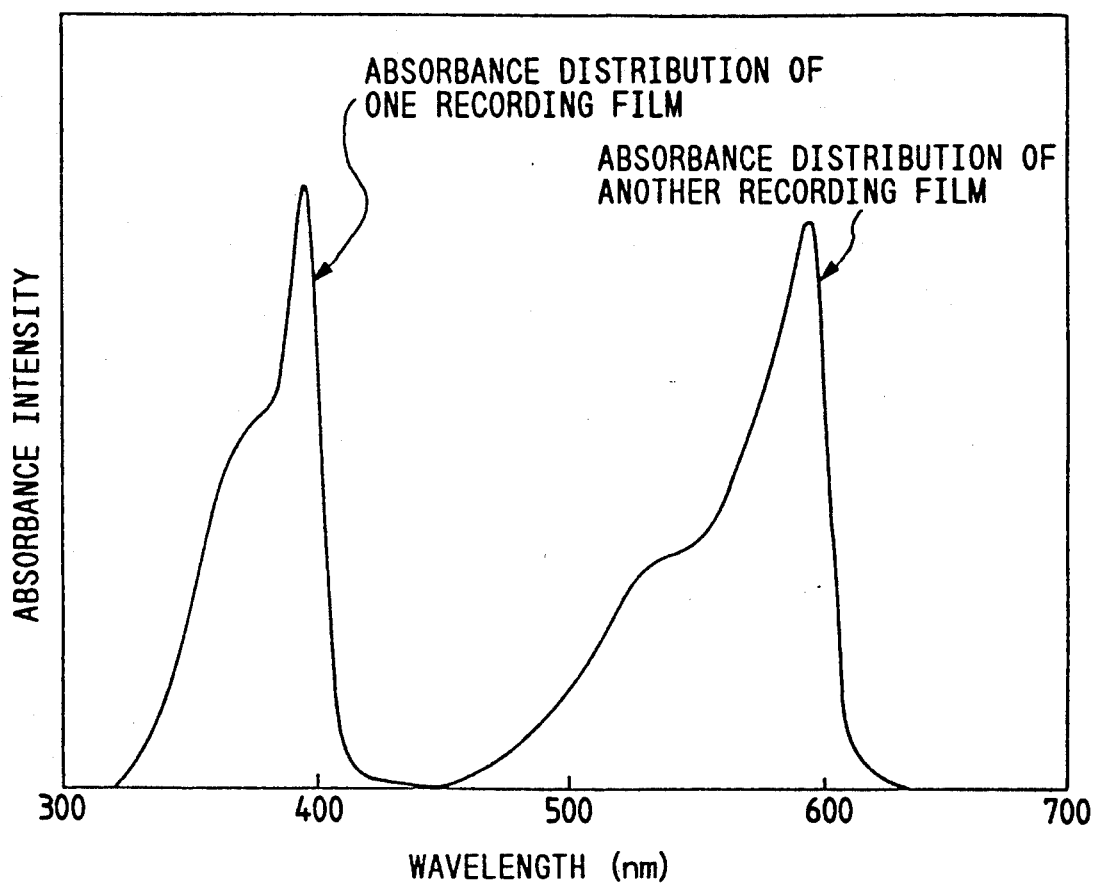

In such a case, the relationship between the film pressure and an absorbance may be changed as shown in FIG. 3, for example. More specifically, in a case where a coloring matter having a characteristic of the above-mentioned $R_1$ type, as the film pressure of the coloring matter film is increased, the absorbance peak is shifted to the longer wavelength side and the intensity of the peak is also increased. At a certain film pressure, the wavelength shift suggesting the formation of a J-aggregate is completed. Accordingly, it is necessary to set the film pressure to a value which is no& lower than the pressure at which the wavelength shift is completed.

The film thus packed at the pressure at which the wavelength shift is completed is transferred to a substrate 10 by vertically moving the substrate 10.

In the above-mentioned preparation, distilled water which has been subjected to pH adjustment may be used as the subphase liquid. Further, a solvent having no compatibility with water and having volatility such as benzene and chloroform may be used as the above-mentioned solvent.

The above-mentioned film pressure control for the monomolecular film may be conducted on the basis of a $\pi$-A curve which has been derived from the film pressure ($\pi$) at the vapor-liquid interface due to compression based on the barrier 22 and a change in the area (A) determined by the position of the barrier 22. Further, when the spectral characteristic of the coloring matter is measured simultaneously with the above-mentioned measurement, the formation of the J-aggregate may also be confirmed by the shift of the absorption peak.

Laser light to be applied to the recording medium according to the present invention may appropriately be selected depending on the absorption peak wavelength of the coloring matter used in the recording medium.

As a matter of course, the recording film to be used in the present invention is not restricted to those having a two layer structure, but may also have a multi-layer structure comprising three or more layers.

Further in a case where four or more layers are laminated to form the recording film, it is possible to dispose two or more pairs, each of which comprises layers having steep absorption end slopes which are closer to each other.

As described hereinabove, the optical recording medium has at least a pair of recording films which have a predetermined light absorption distribution and have steep absorption end slopes which are closer to each other. Accordingly, in the present invention, the difference between the wavelengths of recording or reproduction lights for these two recording films may be close to about 50 nm. As a result, a common optical system may be used for recording or reproduction operation for the two recording films. whereby the optical system may be simplified.

What is claimed is:

1. An optical recording medium comprising a support having disposed on the same side thereof at least a pair of laminated recording films having a light absorption band in a predetermined wavelength region, such that said pair are within a focal depth of a semi-conductive laser, wherein one of the laminated recording film contains cyanine coloring matter represented by the following structural formula

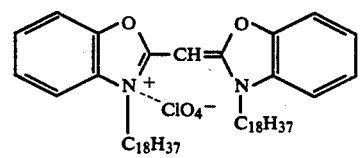

and has a first absorption peak at a first specific wavelength and a steeper absorption slope between the first absorption peak and a point of inflection on the longer wavelength side with respect to the first absorption peak than on the shorter wavelength side thereof, and the other of the laminated recording films contains cyanine coloring matter represented by the following structural formula

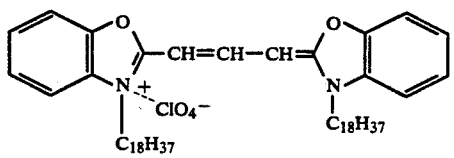

and has a second absorption peak at a second specific wavelength which is in the neighborhood of the first specific wavelength and is longer than the first specific wavelength, and a steeper absorption slope between the second absorption peak and a point of inflection on the shorter wavelength side with respect to the second absorption peak than on the longer wavelength side thereof; and the steeper absorption slopes are close to each other.

2. A medium according to claim 1, wherein each of the recording films comprises a Langmuir-Blodgett film (LB film).

3. A medium according to claim 2, wherein a J-aggregate is formed at the time of the formation of the recording film.

4. A medium according to claim 1, wherein the difference between the first and second absorption peaks is 10 to 100 nm.

* * * * *